United States Patent [19]

Wepfer

[11] Patent Number: 4,570,883
[45] Date of Patent: Feb. 18, 1986

[54] TUBE SUPPORT GRID

[75] Inventor: Robert M. Wepfer, Wilkinsburg, Pa.

[73] Assignee: Westinghouse Electric Corp., Pittsburgh, Pa.

[21] Appl. No.: 490,060

[22] Filed: Apr. 29, 1983

[51] Int. Cl.[4] ............................................. G21C 3/30
[52] U.S. Cl. ...................................... 248/49; 165/162
[58] Field of Search ................ 248/49, 68.1; 165/162, 165/172; 52/666, 668

[56] References Cited

U.S. PATENT DOCUMENTS

| | | | |
|---|---|---|---|
| 1,006,716 | 10/1911 | Bloomer | 52/668 |
| 2,707,537 | 5/1955 | Kilemnik | 52/668 |
| 2,782,696 | 2/1957 | Francis | 52/668 |
| 3,379,617 | 4/1968 | Andrews . | |
| 3,389,451 | 6/1968 | Speca | 52/668 |
| 3,844,887 | 10/1974 | Georges | 165/162 |
| 3,854,529 | 12/1974 | Sagan | 165/162 |
| 3,927,624 | 12/1975 | Hewson | 52/668 |
| 4,036,461 | 7/1977 | Soligno | 165/162 |
| 4,090,918 | 5/1978 | Masetti | 165/162 |
| 4,124,444 | 11/1978 | Jabsen | 248/68.1 |
| 4,160,477 | 7/1979 | Roffler | 248/68.1 |

FOREIGN PATENT DOCUMENTS 2457544 12/1980 France .

Primary Examiner—Reinaldo P. Machado
Assistant Examiner—Alvin Chin-Shue
Attorney, Agent, or Firm—F. J. Baehr

[57] ABSTRACT

A tube support grid for supporting a plurality of closely packed tubes utilizing punched bars with a plurality of resilient and stiff fingers punched into the bar and so disposed that when the bars are assembled into an egg-shaped grid, the tubes are supported on opposite sides by a resilient and a stiff finger extending from the bars.

10 Claims, 4 Drawing Figures

TUBE SUPPORT GRID

BACKGROUND OF THE INVENTION

This invention relates to tube support grids for a heat exchanger and more particularly to a tube support grid for a nuclear steam generator.

During the operation of steam generators, if the water chemistry deviates from narrow limits due to such problems as condenser leaks, corrosion of the tubing and the tubing supports is likely to take place in the vicinity of the contact therebetween. In a grid-type support, the relatively large difference in curvature between the tube and the support at the contact location should tend to inhibit the accumulation of chemical contaminants which lead to corrosion, however, the possibility of such an accumulation is not entirely precluded. The corrosion process has in the past led to deformation of the tubing and of the support structure as a result of the volumetric expansion of the products of corrosion denting the tubing and weakening the support structure.

U.S. Pat. Nos. 4,007,899; 3,998,268; 3,746,617 and 3,298,922 all employ spring-type supports for tubes or rods. U.S. Pat. Nos. 4,007,899 and 3,998,268 each utilize springs welded to a bar while U.S. Pat. No. 3,746,617 utilizes slotted tubes as spacers and U.S. Pat. No. 3,298,922 has rings which make point contact with fuel rods. U.S. Pat. Nos. 3,575,236; 3,854,529 and 3,998,268 are arrangements in which the support assembly is assembled during the process of installing the tubes. U.S. Pat. Nos. 3,292,691; 3,854,529; and 3,292,691 do not provide sufficient compliance of the supporting surfaces to prevent tube denting while other of the patents hereinbefore mentioned that have compliant support surfaces have a large amount of welding therein.

SUMMARY OF THE INVENTION

A tube support grid for supporting a plurality of closely packed tubes, when made in accordance with this invention, comprises a first set of generally parallel flat bars, and a second set of generally parallel flat bars disposed at an angle with respect to the first set of flat bars. The sets of bars have resilient offset portions which are disposed to permit contact with the tubes and stiff offset portions which also are disposed to permit contact with the tubes. The offset portions are so disposed that each tube is permitted to be contacted by a stiff and a resilient offset portion. Each set of bars also has slots which receive the other set of bars and at least one slotted ring which has slots disposed to receive the ends of the flat bars. The grid also comprises means for capturing the ends of the flat bars in the rings to form a unitized tube support grid.

BRIEF DESCRIPTION OF THE DRAWINGS

The objects and advantages of this invention will become more apparent from reading the following detailed description in conjunction with the accompanying drawings, in which.

BRIEF DESCRIPTION OF THE PREFERRED EMBODIMENTS

Figure 1:
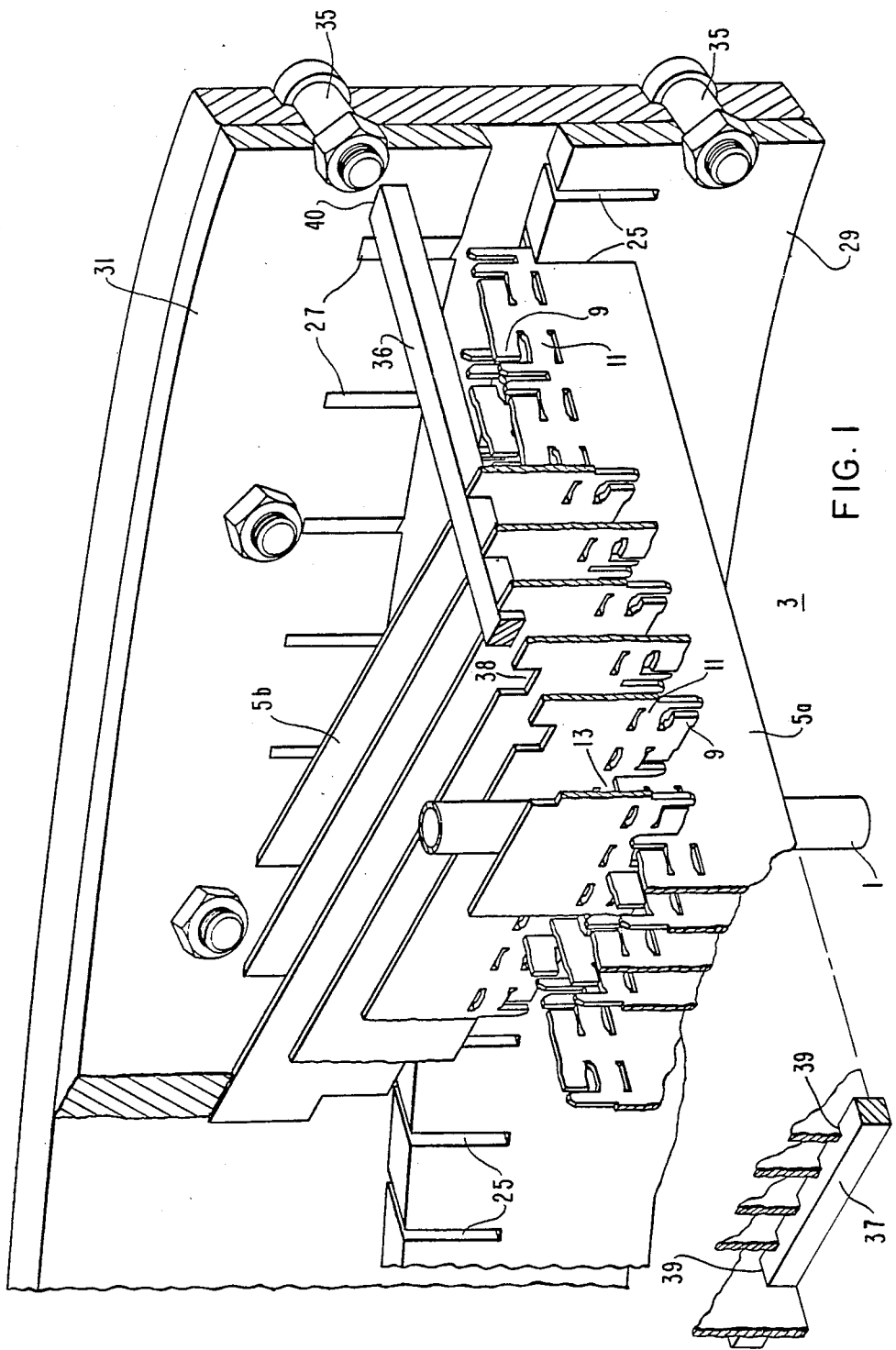
FIG. 1 is a partial isometric view of a tube support grid made in accordance with this invention.

Referring now to the drawings in detail, and in particular to FIG. 1, there is shown a single tube 1 of a plurality of closely packed tubes supported by a tube support grid 3 comprising a first set of generally parallel flat bars 5a and a second set of generally parallel bars 5b disposed normal or at right angles or 90° with respect to each other.

Figure 2:
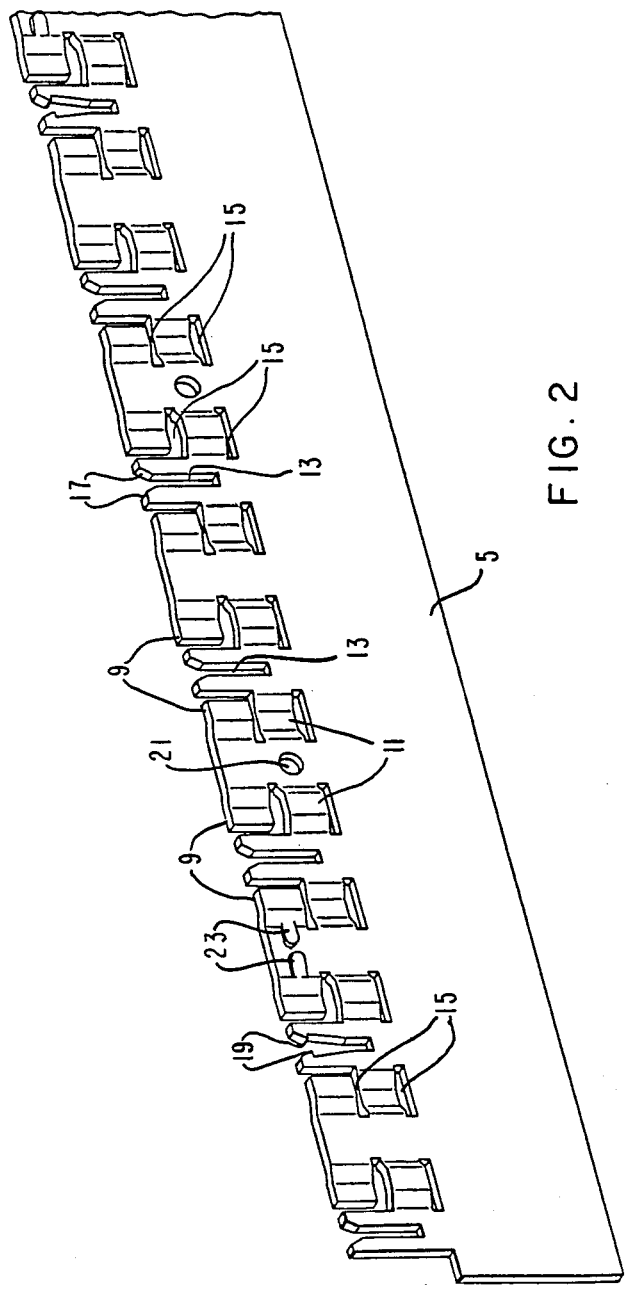
FIG. 2 is a partial isometric view of a bar utilized to form the grid.

As shown best in FIG. 2, the bars 5 are punched so as to shear portions thereof and upset or offset other portions to produce a plurality of resilient offset portions 9 which are formed to resemble a small cantilevered beam and stiff offset portions 11 which are formed to resemble small beams restrained at both ends. Deep slots 13 are also formed in the bars 5 on a double pitch allowing the sets of parallel bars 5a and b to be assembled into an egg-crate shaped grid with a plurality of square shaped enclosures 13. The resilient and offset portions 9 and 11 are so disposed that each separate enclosure 13 formed by the intersecting set of parallel bars 5a and b has four offset portions extending into the enclosure 13, two of which are resilient and two of which are stiff. The resilient and stiff offset portions 9 and 11, respectively, are disposed to oppose each other and on opposite sides of the tubes 1 which pass through the enclosures 13 even though they are disposed at different elevations. It should be noted that the offset portions 9 and 11 are so disposed to permit contact with the tube passing through the enclosure 13. However, there is sufficient clearance between opposing resilient and stiff offset portions 9 and 11 that a tube 1 may pass therebetween without contacting either offset portion 9 or 11. The cantilevered resilient offset portions 9 are disposed on the margins of the bars 5 and are arranged to form a cross of a "T". The stiff offset portions 11 are aligned with and disposed inboard of the resilient offset portions 9 and are offset in the opposite direction from the adjacent outboard resilient offset portion 9. Punched out clearance holes 15 adjacent the offset portions 9 and 11 make offsetting easier.

The slots 13 are chamfered as indicated at 17 adjacent the margins of the bars 5. The chamfers 17 provide an angle lead-in to assist in assembling the sets of bars 5a and b into the grid arrangement. Pawls or hooks 19 are punched in the sides of the slots 13 on a predetermined pitch and register with holes 21 punched into the bars 5. The pawls 19 and holes 21 lock the intersecting sets of bars 5a and b into the grid arrangement assisting the assembly thereof. Nodules or fingers 23 are lanced on a predetermined pitch and provide a groove into which a slotted bar fits to maintain a uniform spacing of one set of bars with respect to the other. The adjacent bars 5 within a set are of different lengths and different hands, the different lengths being required to accommodate the round configuration of the grid 2 and the different hands being required to accommodate the tubes being supported on opposite sides by resilient and stiff offset portions 9 and 11.

The ends of the sets of bars 5a and b fit, respectively, into slots 25 and 27 disposed in rings 29 and 31. The rings 29 and 31 each have a rectangular cross-section and the outside portions of the rings 29 and 31 contact ring 33, also of rectangular cross-section. Bolts 35 or other fasteners connect the rings 29 and 31 to the ring 33 to lock the bars 5a and b into a grid support 3.

To strengthen the grid 3, diametrically disposed wide or square bars 36 and 37 fit in wide slots 38 and 39, respectively, disposed in the sets of bars 5a and b and into an opening 40 in the rings 29 and 31 and may extend into an opening in the ring 33 (not shown). The bars 36 and 37 and slots 38 and 39 are aligned with diametric lines and the bars 36 and 37 are disposed at an angle of 90° with respect to each other.

Figure 3:
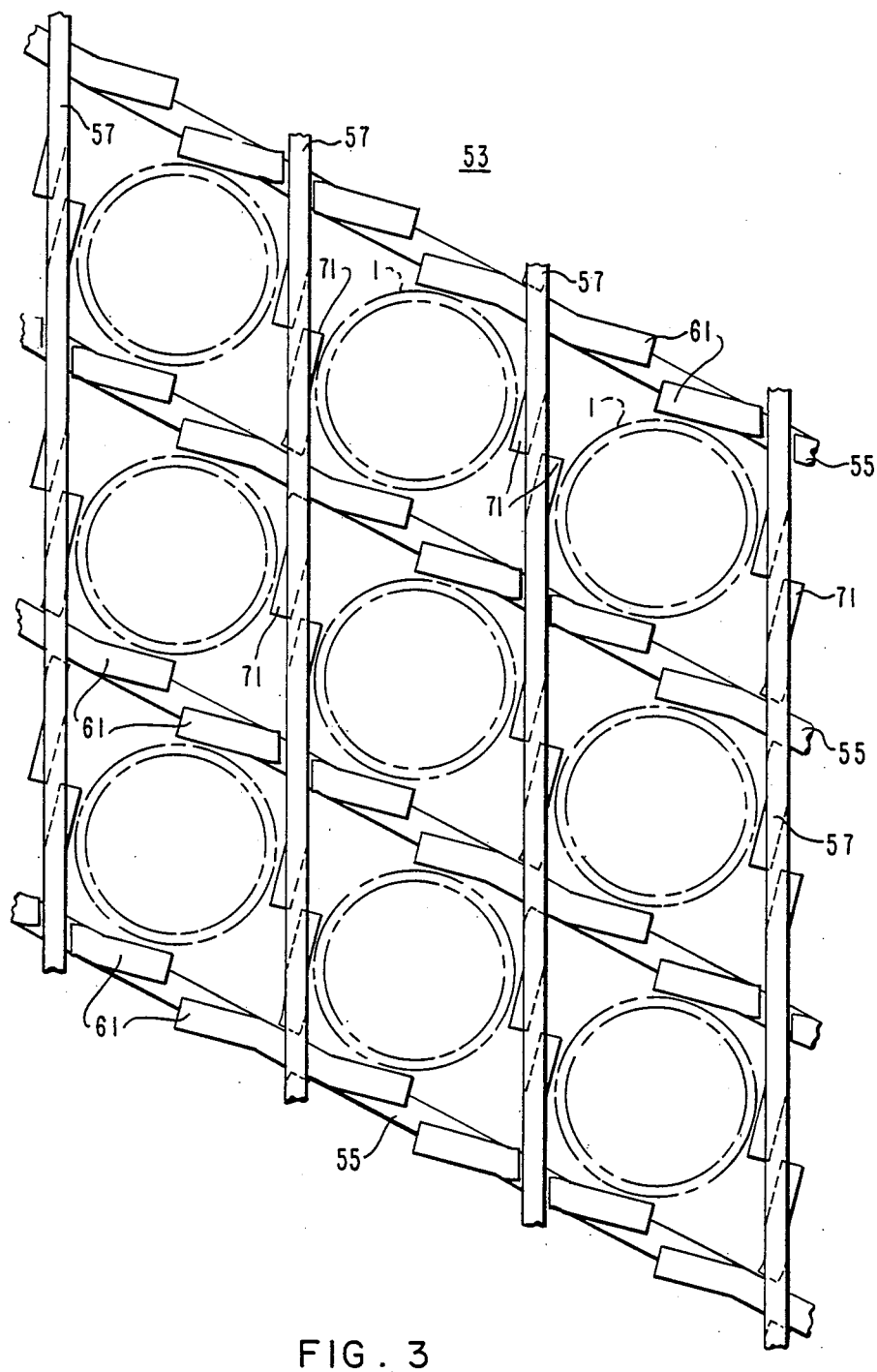
FIG. 3 is a plan view of a portion of an alternative tube support grid.

As shown in FIG. 3, a tube support grid 53 for tubes 1 disposed on a triangular pitch comprises a first set of generally parallel flat bars 55 and a second set of generally parallel flat bars 57 disposed at an angle with respect to each other to form a plurality of diamond-shaped enclosures 59 for the tubes 1.

Figure 4:
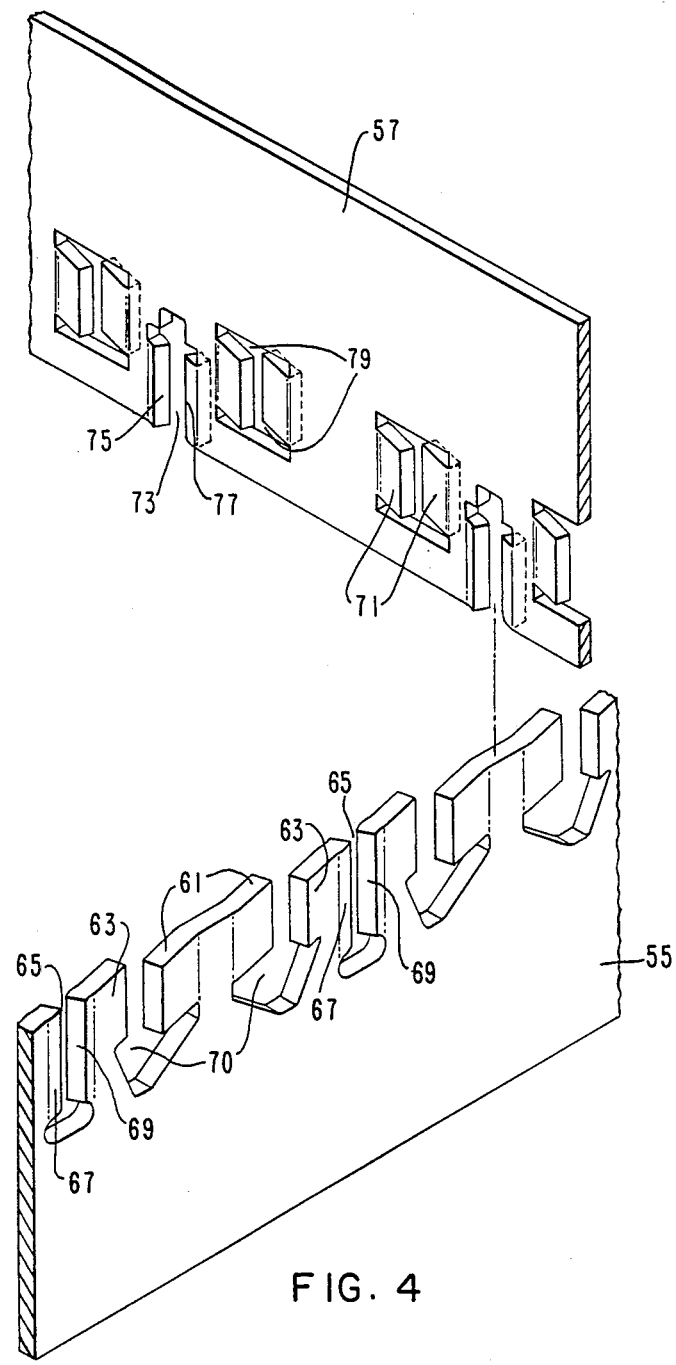
FIG. 4 is a partial exploded isometric view of the bars utilized to form the grid shown in FIG. 3.

The bars 55, as shown best in FIG. 4, are punched to provide a plurality of cantilever-like beam portions 61 adjacent one margin of the bar 55. The cantilever-like beam portions 61 extend out from a common stem forming a T-shaped portion, the ends of the cross of which are offset in opposite directions on opposite sides of the bar 55. The bar 55 also has short cantilever beam-like portions 63 adjacent the one margin with their free ends adjacent the free ends of the cantilever-like beam portion 61 and offset to the opposite side of the bar as the adjacent cantilever beam-like portion 61. Slots 65 also extend from the one margin into the bar 55 and the slots 65 have margins 67 and 69 which are offset in opposite directions to allow for the angular relationship with the bars 57. Clearance holes 70 are punched in the bars 55 to make it easier to offset the portions 61 and 63.

The bars 57 are punched to provide a plurality of cantilever-like beam portions 71 which are disposed inboard of the margins of the beam 57 and are so disposed that the free ends of two cantilever-like portions 71 are adjacent each other and are offset toward opposite sides of the bar 57. The bars 57 also have slots 73 extending from the margin of the bar 57 and the slots 73 have margins 75 and 77 which are offset in opposite directions to allow for the angular relationship with the bars 55. Clearance holes 79 are punched in the bars 57 to make it easier to offset the beam portions 71.

The ends of the bars 55 and 57 are treated in the same manner as the ends of the sets of bars 5a and b as mentioned hereinbefore and have square bars and slots for strengthening the grid 53. However, the ends of the bars 55 and 57 and the square bars and slots therefor are not shown.

The tube support grids hereinbefore described advantageously provide raised or offset portions of bars so arranged to prevent damage to the tubes and maintain overall structural integrity of the support grid even in the event of several different corrosion processes.

What is claimed is:

1. A tube support grid for supporting a plurality of closely packed tubes, said tube support grid comprising:
    a first set of generally parallel flat bars with a pair of generally parallel longitudinal margins;
    a second set of generally parallel flat bars with a pair of generally parallel longitudinal margins disposed at an angle with respect to the first set of flat bars;
    said bars having resilient offset portions which are disposed adjacent one of said margins to permit contact with the tubes and stiff offset portions which are disposed inboard of said margins to permit contact with the tubes;
    said offset portions being so disposed that the stiff and resilient offset portions are generally disposed on opposite sides of the tubes;
    said flat bars being punched adjacent said offset portions forming holes in the flat bars adjacent said offset portions;
    said resilient offset portions and said punched holes cooperating to form "T" shaped portions with short stems and cross portions having ends offset in opposite directions and generally parallel with respect to the flat bars;
    each set of flat bars also having slots which receive the other set of bars;
    at least one slotted ring having slots disposed to receive the ends of said flat bars; and
    means for capturing said ends of said flat bars in said ring to form the tube support grid.

2. A tube support grid as set forth in claim 1, wherein the angle at which the sets of bars are disposed is generally 90°.

3. A tube support grid as set forth in claim 2, wherein the resilient and stiff offset portions are aligned with each other and the center line of the tubes so that they are offset in opposite directions with respect to the bars and permit contact with adjacent tubes.

4. A tube support grid as set forth in claim 1, wherein the resilient offset portions are formed to resemble a small cantilevered beam free on one end and the stiff offset portions are formed to resemble a small beam restrained at both ends.

5. A tube support grid as set forth in claim 1, wherein the open ends of the slots are chamfered and at regular intervals the slots have a pawl disposed on at least one side thereof and the bars have a hole disposed at a predetermined interval to mate with the pawl to lock mating bars into engagement.

6. A tube support grid as set forth in claim 5, and further comprising a pair of small nodules disposed at regular intervals on the bars to maintain a uniform spacing of the bars with respect to each other.

7. A tube support grid as set forth in claim 1, wherein there are two slotted rings, one for each set of parallel bars.

8. A tube support grid as set forth in claim 7, wherein the slotted rings have a rectangular cross-section and which contact an outer ring also having a rectangular cross-section.

9. A tube support grid as set forth in claim 8, and further comprising fasteners for fastening the slotted rings to the outer ring.

10. A tube support grid as set forth in claim 6, wherein the slots are so disposed that they do not register with slots in a mating bar.

* * * * *